United States Patent
Jordan et al.

(10) Patent No.: US 6,697,472 B1
(45) Date of Patent: *Feb. 24, 2004

(54) SYSTEM AND METHOD THEREFOR OF PREVENTING FRAUD ON PAY PHONE CREDIT/DEBIT CALLING CARD AUTHORIZATION

(75) Inventors: David Jordan, Alexandria, VA (US); Frank A. McKiel, Jr., Colo. Spgs., CO (US)

(73) Assignee: WorldCom, Inc., Clinton, MS (US)

( * ) Notice: Subject to any disclaimer, the term of this patent is extended or adjusted under 35 U.S.C. 154(b) by 292 days.

This patent is subject to a terminal disclaimer.

(21) Appl. No.: 09/678,520

(22) Filed: Oct. 3, 2000

Related U.S. Application Data

(63) Continuation-in-part of application No. 09/056,699, filed on Apr. 8, 1998.

(51) Int. Cl.[7] .......................... H04M 17/00; H04M 1/66
(52) U.S. Cl. ............. 379/144.03; 379/143; 379/144.01; 379/144.02; 379/145; 379/188; 379/200
(58) Field of Search ................... 379/144.01, 144.03, 379/144.04, 144.05, 144.06, 145, 146, 154, 155, 188, 189, 194, 199, 200, 350, 377, 143

(56) References Cited

U.S. PATENT DOCUMENTS

| | | |
|---|---|---|
| 3,899,640 A | 8/1975 | Piacente et al. |
| 4,002,848 A | 1/1977 | Stein |
| 4,063,036 A | 12/1977 | Hunsicker |
| 4,188,508 A | 2/1980 | Rogers et al. |
| 4,277,647 A | 7/1981 | Brolin et al. |
| 4,284,851 A | 8/1981 | Schweitzer et al. |
| 4,313,038 A | 1/1982 | Nilssen et al. |
| 4,314,103 A | 2/1982 | Wilson |
| 4,683,583 A * | 7/1987 | Kossor ........................ 379/200 |
| 4,794,642 A * | 12/1988 | Arbabzadah et al. ........ 379/200 |
| 4,896,348 A * | 1/1990 | Grantland et al. ........... 379/145 |
| 4,924,512 A | 5/1990 | Sizemore et al. |
| 4,975,943 A | 12/1990 | Weber et al. |
| 5,150,399 A | 9/1992 | Yasuda |
| 5,150,403 A * | 9/1992 | Jordan ........................ 379/145 |
| 5,327,492 A | 7/1994 | Parola |
| 5,369,690 A | 11/1994 | Comfort |
| 5,392,348 A | 2/1995 | Park et al. |
| 5,425,085 A * | 6/1995 | Weinberger et al. ... 379/112.01 |
| 5,596,632 A | 1/1997 | Curtis et al. |
| 5,694,461 A | 12/1997 | Lee |
| 5,724,404 A | 3/1998 | Garcia et al. |
| 5,745,555 A | 4/1998 | Mark |
| 5,757,896 A * | 5/1998 | Akhteruzzaman et al. .. 379/145 |
| 5,818,931 A | 10/1998 | Movassaghi |
| 6,052,453 A | 4/2000 | Sagady et al. |
| 6,072,863 A * | 6/2000 | Potter, Jr. .................... 379/143 |

* cited by examiner

Primary Examiner—Curtis Kuntz
Assistant Examiner—Quoc Tran

(57) ABSTRACT

To prevent fraud perpetrators from using a public pay telephone to illicitly collect account numbers, authorization codes or personal identification numbers from an unsuspecting user of the telephone, the instant invention disables the keypad of the telephone if an incoming call is being received at the time that the handset is lifted from the phone by the user. In one method, the ringing signal and the off-hook condition are detected and a control output is provided which disengages the dialing tone generating circuits of the telephone until the handset is placed back on-hook. According to an alternative method, after the handset is lifted, a dial tone is sensed and evaluated by a dial tone discriminator to determine whether the dial tone is likely to be a valid dial tone from a legitimate service provider. If the dial tone is determined to be invalid, then the keypad of the telephone is disabled until the handset is placed back on-hook.

36 Claims, 4 Drawing Sheets

SYSTEM AND METHOD THEREFOR OF PREVENTING FRAUD ON PAY PHONE CREDIT/DEBIT CALLING CARD AUTHORIZATION

CROSS-REFERENCE TO RELATED APPLICATIONS

This Application is a continuation-in-part of U.S. patent application Ser. No. 09/056,699, filed Apr. 8, 1998.

FIELD OF THE INVENTION

The present invention relates to the prevention of fraud and more particularly to the prevention of fraudulent misappropriation of credit/debit card authorization numbers and passwords when public pay phones are used.

BACKGROUND

A fraud scheme that has recently come to the attention of telecommunication service providers involves pay phones located in public areas such as airports, train stations and the like. Many such pay phones may not emit an audible ringing sound when a call incoming call is being attempted to the phone. For example, an owner of a restaurant having a pay phone installed as a convenience to the patrons may have the ringer of the phone disabled so that ringing of the phone, as is often caused by mis-dialed numbers, will not annoy others in the restaurant. Alternatively, the pay phone may be programmed that it may ring only once initially, so that incoming calls may be received by a party expecting a call but does not cause undue disturbance to others. Similar measures are often employed in larger public venues, such as airports, where a large number of pay phones are installed side by side and ringing of such phones would only cause confusion and disturbance.

Perpetrators of calling card fraud use this circumstance to obtain calling card numbers from unsuspecting callers. A fraud perpetrator will place a call to a payphone, which will not ring at all or will ring only once and then remain silent. An unsuspecting caller wishing to place a call using a calling card or credit card using the phone will lift the receiver of the phone without being aware that the phone is receiving an incoming call. Upon lifting the receiver, or in other words going "off-hook", the caller will be connected to the fraud perpetrator rather than just to the central office of the telephone network. The fraud perpetrator may even provide a false dial tone sound to convince the caller that they are properly connected to the telephone central office. The caller then dials an access number, the digits of which are usually conveyed by audible in-band signaling tones and maybe easily received by the fraud perpetrator. As many calling card services utilize special sounds and verbal prompts to trigger the caller to input calling card number and personal identification number (PIN number), the fraud perpetrator may cleverly reproduce these sounds in proper order so that the caller cannot distinguish the fraudulent connection from a legitimate connection. Thus, the unsuspecting caller unwittingly provides the fraud perpetrator with calling card and PIN numbers through the telephone line. The fraud perpetrator may then simply disconnect the call, leaving the caller to believe that the call was perhaps mis-dialed or was simply unsuccessful. The caller then usually hangs up and tries again, often without suspicion that a fraud has occurred.

In a variation, the fraud perpetrator may even use two telephone lines so that the call may be completed through the intended service provider in a normal fashion as expected by the caller. The fraud perpetrator simply reoriginates the call along the second line, couples the two lines together, and records the DTMF tones sent. This practice further prevents the caller from being alerted to the fraud taking place. Even though the call is successful, the fraud perpetrator has obtained the caller's private account information and may use the information to fraudulently incur substantial calling card charges or credit card charges before the caller becomes aware of the fraud.

A similar scheme is directed at telephones that use card readers. Oftentimes, a caller will "swipe" a calling card or credit card through a magnetic card reader as a first action, even before checking for dial tone or before taking the phone on-hook and off-hook to ensure a legitimate connection to a telephone switching office. In this case, a fraud perpetrator may already be connected to the telephone and be able to record the data signals transmitted from the card reader.

Another scheme is possible wherein the receiver of a telephone is lifted from the cradle slightly so that the phone appears to be on-hook when it is actually off-hook and connected to a remote party. While this fraud technique works even if the ringer is enabled, it requires the perpetrator to occasionally approach the target telephone, either to redial the fraud connection or to answer the ringing phone and leave it propped off-hook. This method is less preferable to perpetrators because it increases the chances of being apprehended. Even so, this scheme is viable especially where pay phone owners are unwary. It is the caller or the service provider, rather than the pay phone owner, who is victimized. by the fraud and the losses may be substantial.

Accordingly, there is a need for a means of preventing these occurrences of calling card and credit card fraud.

SUMMARY

To prevent the type of credit/calling card abuse outlined above, a pay phone of the present invention may be provided with a device that disables the keypad under certain circumstances. In one to exemplary embodiment, a means is provided for monitoring incoming, or in-bound, calls from the fraud perpetrators that might be answered by an unsuspecting caller wishing to place a call. If the telephone receiver is lifted while an inbound call is detected, the device disables the data transmitting means of the telephone, such as a keypad or a card reader. This prevents the caller from inadvertently sending data to a fraud perpetrator. Especially with the keypad being disabled, the caller will not hear the expected dialing tones as they attempt to enter data using the keypad. Naturally, the caller will tend to momentarily depress the "hook" on the phone, thereby disconnecting the incoming call from the fraud perpetrator. This action ensures connection to the telephone central office and subsequent input from the caller will reach a legitimate service provider as intended. In accordance with an exemplary embodiment of the present invention, this action also restores the normal function of the keypad or card reader so that the caller may subsequently use the phone in a normal manner.

In accordance with a first exemplary embodiment, a circuit added to the pay phone circuitry is designed to monitor for any incoming call signals, for example, by way of detecting the incoming ringing current. The circuit also monitors when the handset of the pay phone is lifted off-hook. If it is determined that the handset of the payphone has been lifted while a incoming call was present, then the circuit will disable the generation of DTMF (dual tone multi-frequency) signals by the telephone so that keypad input from the caller at the pay phone will not be transmitted over the telephone line. The DTMF generation is again enabled only after the caller subsequently places the telephone back on-hook. By this manner of operation, the caller may use the phone in the usual fashion to enter calling card number and PIN number to a legitimate service provider but is prevented from unwittingly providing such information to a fraud perpetrator.

A second exemplary embodiment of the instant invention further provides a circuit for discriminating the tones on the telephone line to detect the presence of a legitimate dial tone, such as the combination of precise 350 Hz and 440 Hz tones normally provided by a local telephone company or a private branch exchange switch. This aspect makes it more difficult for a perpetrator to use primitive equipment, such as a tape recorder or an electronic oscillator, to mimic dial tones. Most callers do not have the ability to discern an authentic dial tone from a false one. With the detection of a true dial tone when the handset is lifted off-hook, a clear line to the intended telephone exchange is further ensured.

Given that the circuits required can be easily added to the conventional telephone circuitry and are relatively inexpensive, the present invention is able to economically prevent the type of fraud described above.

BRIEF DESCRIPTION OF THE DRAWINGS

The above-mentioned objectives and advantages of the present invention will become more apparent and the invention itself will be best understood by reference to the following description of the present invention taken in conjunction with the accompanying drawings, wherein.

DETAILED DESCRIPTION OF EXAMPLE EMBODIMENTS

Though not to be construed as limiting, the figures illustrate different exemplary embodiments of circuits which may be added to the circuitry of a conventional telephone for preventing pay phone credit/debit calling card fraud.

Figure 1:
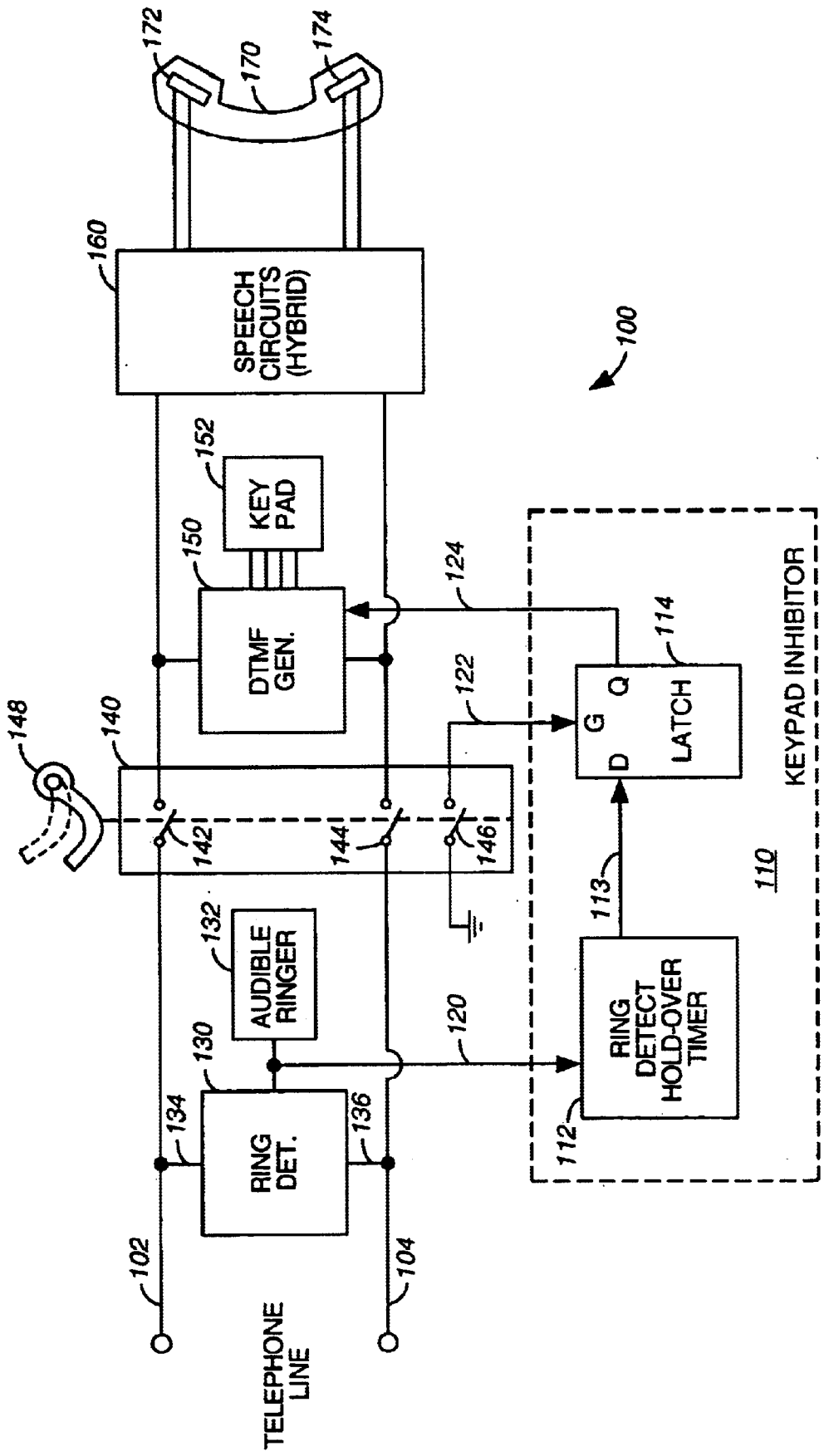
FIG. 1 is a block diagram of a telephone device augmented with a keypad inhibiting device in accordance with an exemplary embodiment of the present invention.

Referring to the accompanying drawings, FIG. 1 is a block diagram of a telephone circuit in accordance with one exemplary embodiment of the present invention. In FIG. 1, a typical telephone device 100 is shown which may be suitable for attaching to a telephone line. In the case of a pay telephone, there are often many other elements, not shown in FIG. 1, such as a coin-receiving means, magnetic card readers, and even microprocessors and visual displays. These other systems are omitted from FIG. 1 for the sake of clarity in describing the present invention. FIG. 1 is shown to comprise a telephone line which, in turn, comprises two electrical conductors, line 102 and line 104. This pair of lines is often called a "twisted pair" and completes an electrical circuit called a "subscriber loop" connecting the telephone to the telephone central office. Pair of lines 102 and 104 are the means by which an average telephone is connected to the telephone network.

In FIG. 1, a ring detector 130 is shown to be coupled to the telephone line along connection 134 and connection 136. Ring detector 130 is a circuit for detecting incoming calls. Ring detector 130 determines when a ringing signal from the telephone network is being applied across lines 102 and 104. Typically, this ring signal is an alternating current signal of about 90 volts peak-to-peak and of a low frequency of around 20 pulses per second. Ring detector 130 is usually coupled to an audible ringer 132 to provide a way of electronically signaling a telephone user that the phone is ringing. Of course, this may be replaced by a visual indication or other means of signaling the user.

Continuing along the telephone line comprising line 102 and line 104, a switch hook 140 is encountered that serves the purpose of controlling whether the telephone line is coupled with the speech circuits 160. A cradle 148 for the telephone receiver is mechanically coupled to switch hook 140 and determines whether numerous pairs of switch contacts within switch hook 140 are engaged or making electrical contact. For example, switch hook 140 is shown to comprise switches 142, 144, 146 which are all normally closed when the receiver is lifted from the cradle and are forced open when the receiver is placed into the cradle. Switch hook 140 detects when handset 170 is lifted from cradle 148. In particular, switch 142 and switch 144 connect lines 102 and 104 respectively to speech circuits 160. Switch hook 140 serves two practical purposes. Switch hook 140 keeps the speech circuits 160 from being connected to the telephone line while the receiver is "on-hook" and prevents an incoming ring signal from damaging the speech circuits. Secondly, when a receiver is lifted and goes "off-hook", switch hook 140 causes the low resistance DC path presented by speech circuits 160 to be connected across the telephone line, lines 102 and 104. In what is known as a "loop start" subscriber loop, this DC path is the means by which a telephone central office recognizes an "off-hook" condition of the telephone, and either stops the ringing signals for inbound calls or provides a dial tone in preparation for outbound calls.

In FIG. 1, to the right side of switch hook 140, there is a DTMF generator 150 coupled to lines 102 and 104. Dual Tone Multiple Frequency (DTMF) generator 150 is also shown to be coupled to a keypad 152. This provides the familiar "touch tone" keypad for performing dialing using the telephone set. In response to a telephone user pressing buttons on keypad 152, DTMF generator creates electrical signals, in standardized pairs of audible frequencies, which are coupled to the telephone line to convey dialing information to a central office attached to the telephone line. DTMF generator 150 and keypad 152 constitute one form of data input encoder by which a telephone user may send data through the telephone line. Other types of data input encoders are often included in public phones or pay phones, such as magnetic card readers and data modems. Finally, lines 102 and 104 are coupled into speech circuits 160 which comprise a hybrid circuit for converting the two wire telephone line into two separate directional signals which then proceed to the earpiece 172 and mouthpiece 174 of telephone handset 170.

All of the elements described thus far in FIG. 1 are analogous to those included in a typical telephone set. No further description of these elements is required herein to understand how to make and use the present invention. It is well known among those of skill in the art how to implement the functions of these elements using passive or active electronic components, or a combination thereof. Likewise, any interfaces to, or adaptations to, these elements as may be needed to implement the present invention will be readily recognized by those of skill in the art and may be accomplished without undue experimentation. The remainder of the elements in FIG. 1 relate to an exemplary embodiment of the present invention beyond the prior art telephone set. The present invention is embodied in a keypad inhibitor 110 which is shown to have several connections with the traditional telephone set described above.

Keypad inhibitor 110 serves the purpose of determining when a ring signal is being received along the telephone line just prior to the receiver being lifted. Keypad inhibitor 110 senses whether a ringing signal is being received. Keypad inhibitor also determines when switch hook 140 is in the off-hook position, meaning when switches 142, 144, and 146 are closed. In response to these inputs, keypad inhibitor 110 determines whether the keypad 152 of the telephone set is enabled and capable of generating tones in conjunction with DTMF generator 150.

From ring detector 130 of the telephone set, keypad inhibitor 110 receives a ring detect signal along input line 120. Those of skill in the art will recognize that, upon an incoming call, a ring signal will be detected by ring detector 130 regardless of whether audible ringer 132 is disabled or configured to ring and then remain silent.

Keypad inhibitor 110 comprises a ring detect hold-over timer 112 and a data latch 114. The ring detect hold-over timer monitors input line 120 and provides a logical output along line 113. Whenever a ring signal is detected and a corresponding logical indication of ring detection is received along input line 120, ring detect hold-over timer 112 begins timing for a set period of time. This time period is around six seconds in accordance with a preferred embodiment of the present invention. This six-second period corresponds to the ring cadence that is common in North America, namely a two-second ring duration with a four-second interval between rings. Connection 113 maintains a high logic level for six seconds after a momentary high logic level has been received along input line 120. In this manner, line 113 reflects whether a ring signal has been received recently and indicates whether ringing is currently in progress regardless of whether ring voltage is actually present at a given instant in time. Thus, when no ring signal has been detected for more than six-seconds, connection 113 will assume a low logic level indicating that no ringing is occurring and that no incoming call is being attempted. Ring detect hold-over timer 112 serves to properly disable a keypad if a user happens to pick up a ringing phone line during the time interval between actual ringing signals. Alternatively, a ring detector 130 may be designed or adjusted to inherently exhibit a hold-over characteristic at its output.

From ring detect hold-over timer 112, connection 113 is coupled the data input of a data latch 114. Data latch 114 is a form of state store device for temporarily remembering a logic state. Briefly, the purpose of latch 114 is to retain the logic state that was present on line 113 at a certain point in time. The "gate" or "clock" input of latch 114 is connected by connection 122 to switch 146, which is part of switch hook 140. The other side of switch 146 is connected to ground as shown in FIG. 1. Those of skill in the art will recognize that switch 146 may be implemented as shown as separate switch contacts within switch hook 140, or may be otherwise achieved by electrical, mechanical, or electro-optical coupling with other switching action normally provided by switch hook 140. When telephone handset 170 is lifted from cradle 148, this action causes the closure of switch 146 which asserts a low logic condition along connection 122. This in turn causes data latch 114 to retain the state that was present along input line 113 and to reflect that stored logic state at its output labeled 'Q'. The output of data latch 114 is then coupled along connection 124 to DTMF generator 150. The purpose of connection 124 is to allow data latch 114 to control whether DTMF generator 150 is enabled and capable of generating outgoing dialing tones. When keypad 152 or DTMF generator 150 are disabled, the telephone user cannot unwittingly convey private information to a fraud perpetrator who was placing a call to the targeted telephone. Similarly, other data entry devices associated with a telephone, such as magnetic card readers., may be disabled using the function of inhibitor 110.

Figure 2:
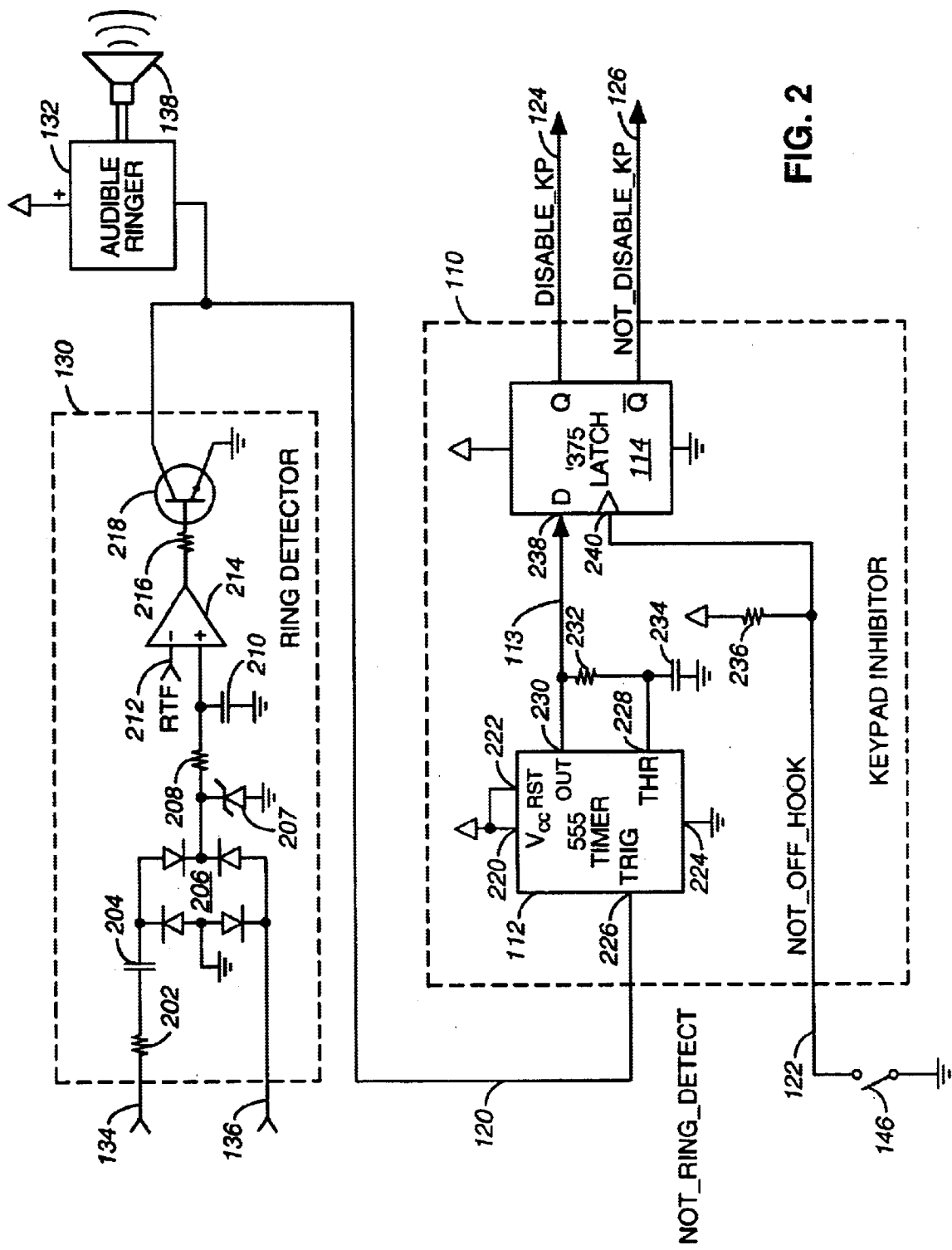
FIG. 2 is a schematic of an electronic circuit for determining when to prevent a telephone keypad from generating dialing signals.

The particular workings of keypad inhibitor 110 in this exemplary embodiment, including ring detect hold-over timer 112 and latch 114 will now be discussed in conjunction with FIG. 2. Turning now to FIG. 2, ring detector 130 and keypad inhibitor 110 are shown in greater detail in accordance with a preferred exemplary embodiment of the present invention. Ring detector 130 as shown is a fairly typical method of performing ring detection and is shown in FIG. 2 merely for reference. The telephone line is coupled to ring detector 130 along connections 134 and 136. As mentioned earlier, a high voltage, low frequency signal will appear across connections 134 and 136 when a ring signal is present. A resistor 202 is shown in connection 134 to limit the current that flows through ring detector 130 and to present a relatively high impedance to the expected high ring voltage. Capacitor 204 is also coupled in series with line 134 in order to achieve an AC coupling of the ring signal into the remainder of ring detector 130. It is undesirable to permit any DC coupling to ring detector 130 mainly because this would cause the central office attached to the telephone line to interpret that the telephone was off-hook. Through resistor 202 and capacitor 204 therefore, connections 134 and 136 are coupled into a rectifier bridge 206 comprising four diodes in a familiar full-wave configuration. Full-wave rectifier bridge 206 accomplishes a conversion of the alternating ring signal into a DC signal which ultimately appears across capacitor 210. A zener diode 207 or similar means is employed to limit the peak voltage that may be observed at the output at the rectifier 206, then resistor 208 serves to limit the charging current and charging rate for capacitor 210. When a ring signal is present across lines 134 and 136, capacitor 210 will begin to charge up and a voltage will appear across capacitor 210. This voltage appearing across capacitor 210 is shown to be coupled into a voltage comparator 214, which may be a common type LM139 voltage comparator with a pull-up resistor (not shown) applied to its output. The positive, or non-inverting, input of the voltage comparator from capacitor 210 is compared to a reference or threshold signal along its negative, or inverting, input 212. When the voltage across capacitor 210 exceeds a preset threshold established at input 212, then the output of comparator 214 assumes a high logic state or high voltage. Then, through resistor 216, the high voltage from comparator 214 turns on transistor 218, which is an NPN transistor and may be a 2N2222-type transistor. The net effect of the circuitry in ring detector 130 is that whenever a ring signal appears across inputs 134 and 136, then the output of the ring detector which is present along connection 120 is pulled to the level of circuit ground (a low-logic state) through transistor 218. As shown in FIG. 2, the fact that transistor 218 provides a path to ground may be used to turn on an audible ringer which may signal the user of the telephone that a ringing signal is being received through an audio transducer 138 such as a speaker or a piezoelectric element. For reasons mentioned earlier, audible ringer 132 is often disabled in public pay phones.

The ring detection circuit described thus far in FIG. 2 is but one example of how a ring signal may be detected on a telephone line. Persons of ordinary skill in the art will recognize that a variety of techniques are possible and have been practiced for performing ring detection. The ring detection circuit of FIG. 2 is not intended to limit the present invention, but is described in some detail to demonstrate how an open collector output may be provided by a particular ring detection circuit and may be used by other circuits coupled to the ring detection output. Of course, other types of output signals may be produced by other ring detection circuits but persons of ordinary skill in the art will know how to adapt these outputs for the purposes of the present invention.

Turning now to keypad inhibitor 110, the signal from the ring detector along line 120 is coupled to the ring detect hold-over timer 112. The signal along line 120 is designated as a NOT_RING_DETECT signal as shown in FIG. 2. Ring detect hold-over line timer 112 is implemented using a common place NE555-type timer circuit to accomplish a six-second hold-over timing function. The active low ring detect signal along line 120 is coupled into trigger input 226 of the 555 timer. Thus, whenever the signal along line 120 goes to a low logic state, then the output of the 555 timer goes to a high state. When the output of the timer 112 goes to a high state, then capacitor 234 begins charging through resistor 232. In accordance with a preferred embodiment of the present invention, the six-second timing function is accomplished by the use of a value of 270 Kohms for resistor 232 and a value of 22 microfarads for capacitor 234. The threshold input 228 of the 555 timer monitors the charge that builds up on capacitor 234 and when that voltage reaches two thirds of Vcc, then 555 timer 112 is reset and output 230 goes low. This manner of operation as a monostable multivibrator is well known and published for the 555 timer. The remainder of the connections for the 555 timer are well known also. The voltage supply for the timer is provided along Vcc input 220 and the reset pin 222 is also tied to Vcc in order to allow the timer to operate. The ground connection for the 555 timer is provided along connection 224.

The output of timer 112 is coupled along line 113 to the input 238 of latch 114. Latch 114 is commonly known as a D-type latch and may be, for example, the 74HC375 model latch circuit which is commercially available. Latch 114 functions as follows. A gate or enable input 240 is provided that determines whether latch 114 is tracking the input provided at its input 238 or whether it is in a latched condition, meaning that its outputs stay in a fixed state. For as long as gate input 240 remains high, any input present along data input 238 will appear at output 'Q' and as the data input at 238 changes then the output at 'Q' will change accordingly. However, when the enable input 240 is taken to a low logic state, then output 'Q' of latch 114 adopts whatever state input 238 was in at the instant that enable input 240 went low. When this has occurred, latch 114 is said to be in a latched condition and any further changes to the state of input D 238 will not affect the output state of the latch at output 'Q'. Latch 114 therefore retains the information that was present input 238 at the instant when enable input 240 assumed a low logic state. The enable input 240 to latch 114 is provided by switch hook 140 and, as shown in FIG. 2, is specifically derived from the closure of switch 146. One side of switch 146 is connected to ground and the other side of switch 146 is provided as an active low off-hook indicator to keypad inhibitor 110. Within keypad inhibitor 110, a resistor 236 is shown connected between connection 122 and the power supply, Vcc. This accomplishes a "pull-up" of line 122 so that when switch 146 is open, enable input 240 at latch 114 is at a high state; and when switch 146 is closed then the voltage at line 122 is brought to ground and the input 240 to latch 114 adopts a low logic state.

The net effect is that, the instant that a receiver is lifted from the cradle 148, a determination is made as to whether ringing was in progress at the time that the receiver was lifted from the cradle. The role of keypad inhibitor 110 is to determine whether the keypad should be disabled because a ringing signal was being received just prior to the receiver being lifted from the cradle. This determination by keypad inhibitor 110 is manifested at output 'Q' of latch 114 which is coupled along connection 124 to DTMF generator 150. As will be described later, there are numerous techniques for enabling or disabling the keypad of a telephone set. Therefore a pair of complementary outputs are shown provided from keypad inhibitor 110 namely a DISABLE_KP output 124 and an active low NOT_DISABLE_KP output 126. Either one may be used according to whatever circuitry is employed and what signals are desired for enabling or disabling the keypad or other data entry device.

Figure 3:
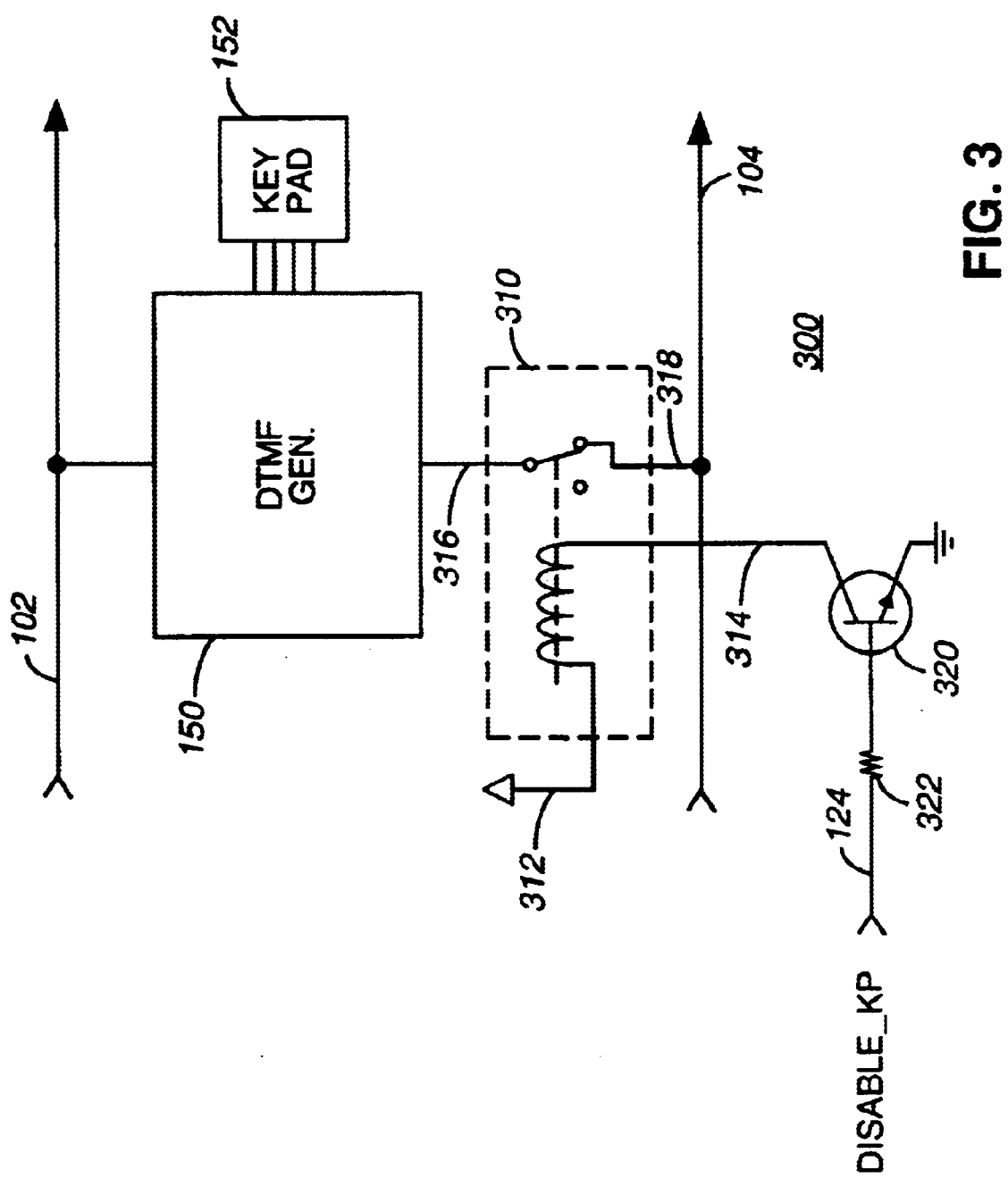
FIG. 3 is a schematic of an electronic circuit for causing the DTMF generating means of a telephone to be disengaged from a telephone line.

Briefly referring back to FIG. 1, connection 124 from latch 114 is shown coupled to DTMF generator 150 for the purpose of determining whether DTMF generator 150 is enabled or disabled. Turning now to FIG. 3 of the drawings, a disengaging device 300 for disabling the DTMF generator is provided as one example embodiment. As was previously shown in FIG. 1, a DTMF generator 150 is shown to be coupled to the lines of a telephone line, namely lines 102 and 104. DTMF generator 150 is also shown to be coupled to keypad 152. Note however that in coupling DTMF generator 150 to telephone line 104 that a relay 310 has been inserted therebetween. The switching action of relay 310 controls whether DTMF generator 150 is coupled through connections 316 and 318 and thereby to line 104. Thus relay 310 determines whether DTMF generator 150 is capable of coupling any signals into the telephone line comprising lines 102 and 104. In turn, the control of relay 310 is provided by the transistor circuitry in the remainder of circuit 300. The coil of relay 310 is shown to have one terminal attached to the power supply along connection 312 and the other terminal of the coil attached to the collector of transistor 320 along connection 314. For as long as the coil of relay 310 is de-energized, then connection 316 remains connected to connection 318 and DTMF generator 150 remains coupled to the telephone line, lines 102 and 104. Transistor 320 is an NPN transistor which may be used to energize relay 310 and thereby cause DTMF generator 150 to be decoupled from telephone lines 102 and 104. A DISABLE_KP (disable keypad) input may be received along line 124 and coupled to the base of transistor 320 through a resistor 322. Thus, whenever the DISABLE_KP input adopts a high logic level, current flows through resistor 322 through the base of transistor 320 which turns on transistor 320, causes current to flow from the collector to the emitter of transistor 320, energizes relay 310, and thereby disconnects DTMF generator 150 from line 104.

The arrangement of FIG. 3 is but one of many ways that a DTMF generator 150 or a keypad 152, or any other means of generating dialing tones or sending data, may be disabled. It is conceivable that in some implementations a DTMF generator or a keypad may already have inputs that allow for enabling or disabling those systems. It is also possible to enable or disable such systems through the removal of primary power to those systems or by interrupting the flow of current to connectors on the keypad. In some embodiments where an integrated circuit is used to generate precision DTMF tones, such as the Motorola MC34010 "telephone on a chip" circuit, a frequency reference, such as an external reference crystal, may easily be disabled which in turn disables the generation of any tones from the chip. Those of ordinary skill in the relevant art will recognize there many approaches to disable the keypad of a telephone or the DTMF generator that creates tones in response to the keypad.

Figure 4:
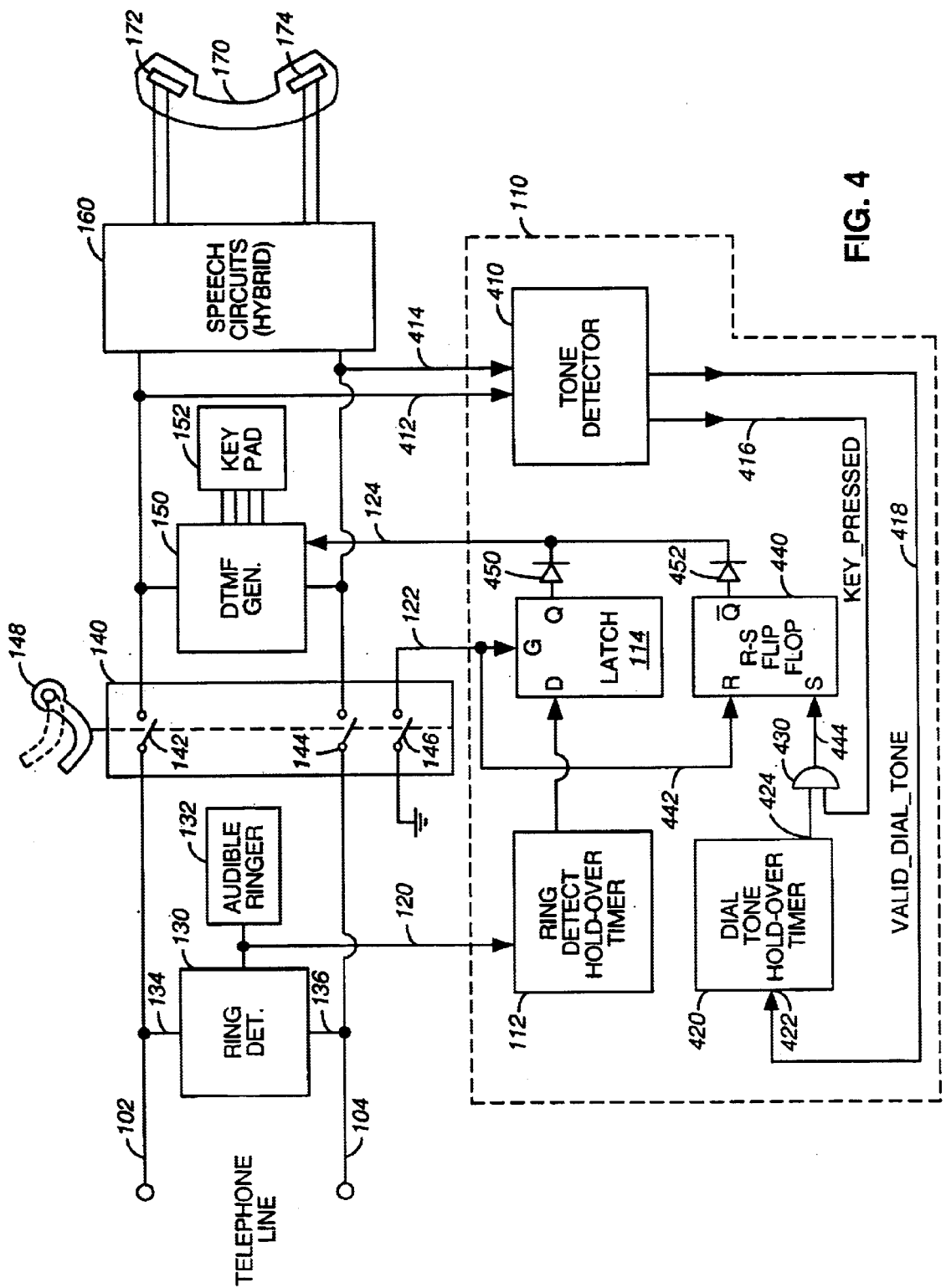
FIG. 4 is a block diagram of an telephone device comprising a keypad inhibiting device that requires the sensing of a valid dial tone signal before enabling the telephone keypad.

Turning now to FIG. 4 of the drawings, a block diagram of a telephone set is shown that may comprise an alternate embodiment of the present invention. The telephone set shown in FIG. 4 accomplishes the same function as described for the telephone set in FIG. 1 and further adds the function of detecting a valid dial tone before permitting the keypad to operate. For this purpose, some elements are added to keypad inhibitor 110. These additional elements are a tone detector 410, a dial tone hold-over timer 420, and a flip-flop 440. Tone detector 410 is shown coupled to telephone lines 102 and 104 along connections 412 and 414. As long as switch hook 140 is in an off-hook condition, switches 142 and 144 are closed and therefore telephone lines 102 and 104 are coupled to tone detector 410. Tone detector 410 is able to detect locally generated DTMF tones as well as acceptable dial tones or other signals provided by the telephone network. In response to the detection of dial tones and DTMF tones, tone detector 410 generates two outputs. One output is a KEY_PRESSED output 416 and the other is a VALID_DIAL_TONE output 418. Methods for performing tone detection are well known among those of ordinary skill in the art. For example, a particular DTMF decoder circuit, model MC145740, is known to be manufactured by Motorola, Inc. A common LM367-type general-purpose tone decoder may also be used to detect the presence of specific frequencies within the dial tone signal.

A possible criteria for evaluating the validity of a dial tone is whether the observed frequencies of the dial tone are acceptably close to expected values, such as 350 Hz and 440 Hz. A dial tone signal may also be validated on the basis of dial tone signal amplitude, particularly relative amplitude between multiple components of the dial tone. In some localities, phase relationships within the dial tone signal may provide some indication of validity. Similarly, the waveform of the dial tone may be sufficiently distinct to allow for validation on this basis. As an alternate or additional form of validation, the dial tone signal may even be compared with a reference signal, such as a signal obtained directly from a legitimate local telephone switching office. The present invention is not limited to specific choices of how a dial tone is to be validated. Those of common skill in the art may implement such variations without undue experimentation.

The VALID_DIAL_TONE output 418 is provided as input to dial tone hold-over timer 424. Dial tone hold-over timer 424 performs in a similar manner as ring detect hold-over timer 112 and in fact may be implemented using a 555 timer as was shown in FIG. 2 earlier.

As an alternative to using an active timer circuit for dial tone hold-over circuit 424, a simple capacitive charging circuit may be used to provide a brief persistence of the VALID_DIAL_TONE indication. In either case, the purpose is that, whenever input 422 goes high, output 424 should go to a high logic state and stay there for a brief period of time even after input 422 reverts to a low state. The hold-over time for dial tone hold-over timer 420 is preferably on the order of 200 milliseconds to 500 milliseconds. Upon pressing a key on the keypad, the circuitry of FIG. 4 can ascertain whether a dial tone was present just prior to the pressing of the button on the keypad. Normally, upon pressing a key on the keypad, the dial tone either naturally ceases or is overshadowed by the signal produced by DTMF generator 150. Therefore, dial tone hold-over timer 420 serves to remember for a brief time whether a valid dial tone has been present. Output 424 from dial tone hold-over timer 420 is applied to an AND gate 430. The other input to AND gate 430 is the KEY_PRESSED signal 416 from tone detector 410. KEY_PRESSED signal 416 is active whenever a DTMF tone is being generated by DTMF generator 150 in response to a user pressing a key on keypad 152. By the action of the AND gate 430, whenever a valid tone has been present very recently as evidenced by an active state of output 424 and upon the initial pressing of a key as evidenced by a high transition along line 416, then output of AND gate 430 is connected to line 444 and causes flip-flop 440 to enter a SET state, as described below. Other arrangements of logic gates may perform a similar function as AND gate 430.

Flip-flop 440 is a type of state storing device sometimes more formally referred to as a bistable multivibrator. The SET state of flip-flop 440 means that its 'Q' output adopts a high logic state and it's 'NOT_Q' output adopts a low logic state. To reverse the state of flip-flop 440, a high state must be applied at its reset input. In FIG. 4, this reset input is provided through switch 146 which is a part of switch hook 140. By virtue of connection 442, whenever handset 170 is resting in cradle 148, the telephone set is said to be "on-hook" and the reset input of flip-flop 440 goes to a high state. At this point, the flip-flop is said to have entered a RESET state, meaning that its 'Q' output is low and its 'NOT_Q' output is high. When handset 170 is lifted from cradle 148 and switch hook 140 causes the closure of switch 146, then a low logic signal is present along line 442 at the reset input of flip-flop 440. This does not however, change the state of flip-flop 440. The state of flip-flop 440 remains reset until a high signal is presented at set input along line 444. By the device described earlier, a pulse to the set input will only occur when a valid dial tone has been received by tone detector 410 and upon the initial entry of a keypad button push by the telephone user as evidenced by an active signal along line 416. The presence of a valid dial tone and the instance of a key being pressed causes a very brief high logic pulse to be applied along line 444 to flip-flop 440 causing it to become set. This means that when a valid dial tone has been received at the time of a key being pressed, then flip-flop 440 transitions to a set state and remains there until switch hook 140 is returned to the "on-hook" position. This means that the 'NOT_Q' output of 440 stays in a logic low state. This 'NOT_Q' output of flip-flop 440 is shown in FIG. 4 to be coupled through diode 452 to line 124 that controls DTMF generator 150. FIG. 4 also shows the 'Q' output of latch 114 to be similarly coupled through a diode 450 to line 124 to control DTMF generator 150. Diodes 450 and 452 implement an OR operation between latch 114 and flip-flop 440. Thus, if either the 'Q' output of latch 114 is high or the 'NOT_Q' output of flip-flop 440 is high, then the DTMF generator will be disabled. Functionally then, this amounts to disabling the DTMF generator whenever either there was a ring detected at the time the receiver was removed from the cradle or whenever the dial tone present at the time that the first key is pressed by the user is not a valid dial tone.

Those of ordinary skill in the art will recognize that in some installations, as an alternative to using tone detector 410 to sense DTMF tones, the pressing of a key on a keypad may be detected directly by connections to the keypad or other associated circuitry.

As those of skill in the art will appreciate, the present invention is effective in preventing fraudulent procurement of calling card numbers and the like using pay phones that do not ring at all or that ring only initially then remain silent. The present invention may be applied to phones that obtain and transmit information using magnetic card readers or the like as input devices. Any such input devices may be disabled if the telephone unit goes off-hook while an incoming call is being received. The present invention is also a deterrent to fraud using phones that do ring, wherein the perpetrators place a call to the target phone and then prop the receiver in an off-hook condition.

Those of ordinary skill in the art will also recognize that other variations or adaptations are possible that differ from the exemplary embodiments shown, but which embody the present invention nonetheless. For example, in a microprocessor-based telephone, many of the functions accomplished by the keypad inhibitor circuit shown in the figures may be implemented in software, especially where even such native functions as DTMF generation are already implemented as software processes in digital signal processing (DSP) circuits. Furthermore, while the approach taught in accordance with the present invention has been shown and described in the context of a traditional analog telephone line, those of skill in the art will recognize that the present invention may be readily extended to telephones and the like which interface through Integrated Services Digital Network (ISDN) lines, private branch exchanges(PBXs), or packet-switched network connections.

Inasmuch as the present invention is subject to many variations, modifications, and changes in detail, it is intended that all matters described in this specification and shown in the accompanying drawings be interpreted as illustrative only and not in a limiting sense. Accordingly, it is intended that the invention be limited only by the spirit and scope of the claims appended hereto.

What is claimed is:

1. A method for preventing fraudulent procurement of private data from a caller using a telephone, the telephone comprising a data entry device to produce data signals that may be sent from the telephone, the method comprising the steps of:
   - detecting when the telephone has been placed in an off-hook condition;
   - determining if the telephone is receiving an incoming call at substantially the same time the telephone is placed in an off-hook condition; and
   - disabling the sending of data signals from the data entry device if an incoming call is being received at substantially the same time that the telephone is placed in an off-hook condition.

2. The method of claim 1 further comprising: enabling the sending of data signals from the data entry device when the telephone is placed in an off-hook condition while no incoming call to the telephone is detected.

3. The method of claim 1 further comprising the step of detecting if the telephone is receiving an incoming call signal.

4. The method of claim 3 further comprising the step of, upon detecting that the telephone is receiving an incoming call signal, maintaining for a period of time thereafter an incoming call indication having a logical state that represents that an incoming call signal has recently been received.

5. The method of claim 4 further comprising the step of, upon the telephone being placed in an on-hook condition, setting the incoming call indication to a logical state representing that an incoming call has not been recently received.

6. The method of claim 4 wherein the step of determining if the telephone is receiving an incoming call at substantially the same time that the telephone is placed in an off-hook condition further comprises the step of, upon detecting that the phone has been placed in an off-hook condition, remembering the state of the incoming call indication.

7. The method of claim 6 further comprising the step of using the remembered state of the incoming call indication to control the ability of the data entry device to send data signals.

8. A device for preventing fraudulent procurement of private data from a caller using a telephone, the telephone being normally capable of transmitting data, the device comprising:
   - an incoming call input connection for receiving an incoming call indication from the telephone when the telephone is receiving an incoming call signal;
   - an off-hook input connection for receiving an off-hook indication from the telephone when the telephone is in an off-hook condition; and
   - an inhibitor device responsive to the incoming call indication and the off-hook indication which prevents the telephone from transmitting data when the telephone enters an off-hook condition at substantially the same time that an incoming call to the telephone is detected.

9. The device of claim 8 further comprising a disengaging device, responsive to an output of the inhibitor device, for controlling the ability of the telephone to transmit data.

10. The device of claim 8 wherein the inhibitor device comprises a state storing device to store the state of the incoming call indication upon the telephone being placed in an off-hook condition, an output of the state storing device being used to control the ability of telephone to transmit data.

11. The device of claim 8 wherein the inhibitor device comprises a timer which adopts one logic state at its output in response to the incoming call indication and maintains said logic state for a period of time thereafter even if the incoming call indication subsequently changes state during the period of time.

12. The device of claim 11 wherein the inhibitor device further comprises a state storing device coupled to the output of the timer to store the state of the incoming call indication upon the telephone being placed in an off-hook condition, an output of the state storing device being used to control the ability of the telephone to transmit data.

13. A telephone which prevents unauthorized procurement of private data from a caller, wherein the telephone is coupled to a telephone line and comprises a data entry device, the telephone comprising:
   - an incoming call detector coupled to the telephone line for providing an incoming call indication when an incoming call is detected on the telephone line;
   - an off-hook detector for providing an off-hook indication when the telephone is placed in an off-hook condition; and
   - an inhibitor device, responsive to the incoming call indication and the off-hook indication, which prevents the data entry device from sending data through the telephone line if an incoming call is detected at substantially the same time as the telephone is placed in an off-hook condition.

14. The telephone of claim 13 further comprising a disengaging device, responsive to an output of the inhibitor device, for controlling the ability of the data entry device encoder to send data signals through the telephone line.

15. The telephone of claim 13 wherein the data entry device is a keypad which causes DTMF tones to be sent through the telephone line.

16. The telephone of claim 13 wherein the data entry device is a keypad which causes digital data carrying signals to be sent through the telephone line.

17. The telephone of claim 13 wherein the data entry device is a reader of magnetic media which causes digital data carrying signals to be sent through the telephone line.

18. The telephone of claim 13 wherein the inhibitor device comprises a state storing device to store the state of the incoming call indication upon the telephone being placed in an off-hook condition, an output of the state storing device being used to control the ability of the data entry device to send data through the telephone line.

19. The telephone of claim 13 wherein the inhibitor device comprises a timer which adopts one logic state at its output in response to the incoming call indication and maintains said logic state for a period of time thereafter even if the incoming call indication subsequently changes state during the period of time.

20. The telephone of claim 19 wherein the inhibitor device further comprises a state storing device coupled to the output of the timer to store the state of the incoming call indication upon the telephone being placed in an off-hook condition, an output of the state storing device being used to control the ability of the data entry device to send data through the telephone line.

21. A method for preventing fraudulent procurement of private data from a caller using a telephone, the telephone comprising a data entry device by which the caller may send data from the telephone, the method comprising the steps of:
   detecting when the telephone has been placed in an off-hook condition;
   determining if the telephone is receiving an incoming call signal at substantially the same time that the telephone is placed in an off-hook condition;
   determining when the caller attempts to send data using the telephone;
   determining if a dial tone being received by the telephone is valid; and
   disabling the output of data signals from the data entry device if either an incoming call is present at substantially the same time that the telephone is placed in an off-hook condition or a dial tone determined to be valid is not present when the caller attempts to send data from the telephone.

22. The method of claim 21 further wherein said step of determining if a dial tone being received by the telephone is valid is performed at the first time that a caller attempts to send data after the telephone has been placed in an off-hook condition.

23. The method of claim 21 further comprising:
   detecting the presence of a dial tone signal on the telephone line to satisfy at least one criterion indicative of a valid dial tone;
   maintaining, while the telephone remains in an off-hook state, a valid dial tone indication to indicate whether a detected dial tone has been determined valid since the time that the phone was initially placed in an off-hook state;
   remembering, while the telephone remains in an off-hook state, the state of the valid dial tone indication at the time that the caller attempts to send data from the telephone; and
   using the remembered state of the valid dial tone indication to control whether data may be sent from the telephone.

24. The method of claim 23 wherein at least one criterion is based upon measurement of frequency characteristics of the dial tone signal.

25. The method of claim 23 wherein at least one criterion is based upon measurement of amplitude characteristics of the dial tone signal.

26. The method of claim 23 wherein at least one criterion is based upon measurement of phase characteristics of the dial tone signal.

27. The method of claim 23 wherein at least one criterion is based upon the observed waveform of the dial tone signal.

28. The method of claim 23 wherein at least one criterion is based upon comparing the dial tone signal to a reference dial tone signal.

29. A device for preventing fraudulent procurement of private data from a caller using a telephone, the telephone being normally capable of sending data, the device comprising:
   an incoming call input connection for receiving an incoming call indication from the telephone when the telephone is receiving an incoming call signal;
   an off-hook input connection for receiving an off-hook indication from the telephone when the telephone is in an off-hook condition;
   a valid dial tone input connection for receiving a valid dial tone indication when a dial tone determined to be valid is present on the telephone line;
   a data entry input connection for receiving a data entry indication when the caller attempts to send data using the telephone; and
   an inhibitor device, responsive to at least one of the incoming call indication, the off-hook indication, the valid dial tone indication, and the data entry indication, which prevents the data entry device from providing outgoing data if either an incoming call is detected at substantially the same time as the telephone is placed off-hook or a dial tone determined to be valid is not present when the caller attempts to send data using the telephone.

30. The device of claim 29 further comprising a dial tone detector coupled to the telephone which provides a valid dial tone indication when the telephone is receiving a dial tone that meets criteria for a valid dial tone.

31. The device of claim 29 further comprising a data entry detector which activates a data entry indication signal when the caller attempts to send data using the telephone.

32. The device of claim 29 wherein the inhibitor device comprises a state storing device that, responsive to the valid dial tone indication and off-hook indication, assumes a first logic condition when a valid dial tone is detected and assumes a second logic condition when the telephone is placed on-hook, whereby an output of the state storing device represents whether a valid dial tone has been detected since the telephone was placed off-hook and the output is used to control whether the telephone can transmit data.

33. The device of claim 29 wherein the inhibitor device comprises:
   a dial tone timer which adopts one logic state at its output in response to the valid dial tone indication and maintains said logic state for a period of time thereafter even if the valid dial tone indication subsequently changes state during the period of time;

a logic gate with one input coupled to the output of the dial tone timer and one input coupled to the data entry indication, the logic gate having an output indicating when the signal from the dial tone timer and the data entry indication coincide; and a state storing device that is set to a first logic condition in response to the output of the logic gate and is set to a second logic condition when the off-hook indication shows the telephone to be on-hook, whereby the output of the state storing device represents whether a valid dial tone has been present since the telephone was last placed off-hook and the output of the state storing device is used to control whether the telephone can transmit data.

34. A telephone which prevents unauthorized procurement of private data from a caller, wherein the telephone is coupled to a telephone line and comprises a data entry device by which the caller may normally communicate data, the telephone comprising:

an incoming call detector coupled to the telephone line for providing an incoming call indication when the telephone is receiving an incoming call signal;

an off-hook detector for providing an off-hook indication signal when the telephone is placed in an off-hook condition;

a dial tone detector for providing a valid dial tone indication signal when a dial tone determined to be valid is present on the telephone line;

a data input detector for providing a data input indication signal when the caller attempts to send data using the telephone; and an inhibitor device, responsive to at least one of the incoming call indication, the off-hook indication, the valid dial tone indication, and the data input indication, which prevents the data entry device from providing outgoing data if either an incoming call is detected at substantially the same time that the telephone is placed off-hook or a dial tone determined to be valid is not detected when the caller attempts to send data using the telephone.

35. The telephone of claim 34 wherein the inhibitor device comprises a state storing device that, responsive to the valid dial tone indication and off-hook indication, assumes a first logic condition when a valid dial tone is detected and assumes a second logic condition when the telephone is placed on-hook, whereby an output of the state storing device represents whether a valid dial tone has been detected since the telephone was placed off-hook and the output is used to control whether the data entry device can transmit data.

36. The telephone of claim 34 wherein the inhibitor device comprises:

a dial tone timer which adopts one logic state at its output in response to the valid dial tone indication and maintains said logic state for a period of time thereafter even if the valid dial tone indication subsequently changes state during the period of time;

a logic gate with one input coupled to the output of the dial tone timer and one input coupled to the data entry indication, the logic gate having an output indicating when the signal from the dial tone timer and the data entry indication coincide; and a state storing device that enters a first logic condition in response to the output of the logic gate and enters a second logic condition when the telephone off-hook indication indicates that the telephone has gone on-hook, whereby the output of the state storing device represents whether a valid dial tone has been present since the telephone was last placed off-hook and the output of the state storing device is used to control whether the data entry device encoder may send data.

* * * * *